March 25, 1958   W. A. SWANEY ET AL   2,828,188
APPARATUS FOR THE RECOVERY OF ANTHRACENE AND THE LIKE
Filed May 19, 1954   3 Sheets-Sheet 2

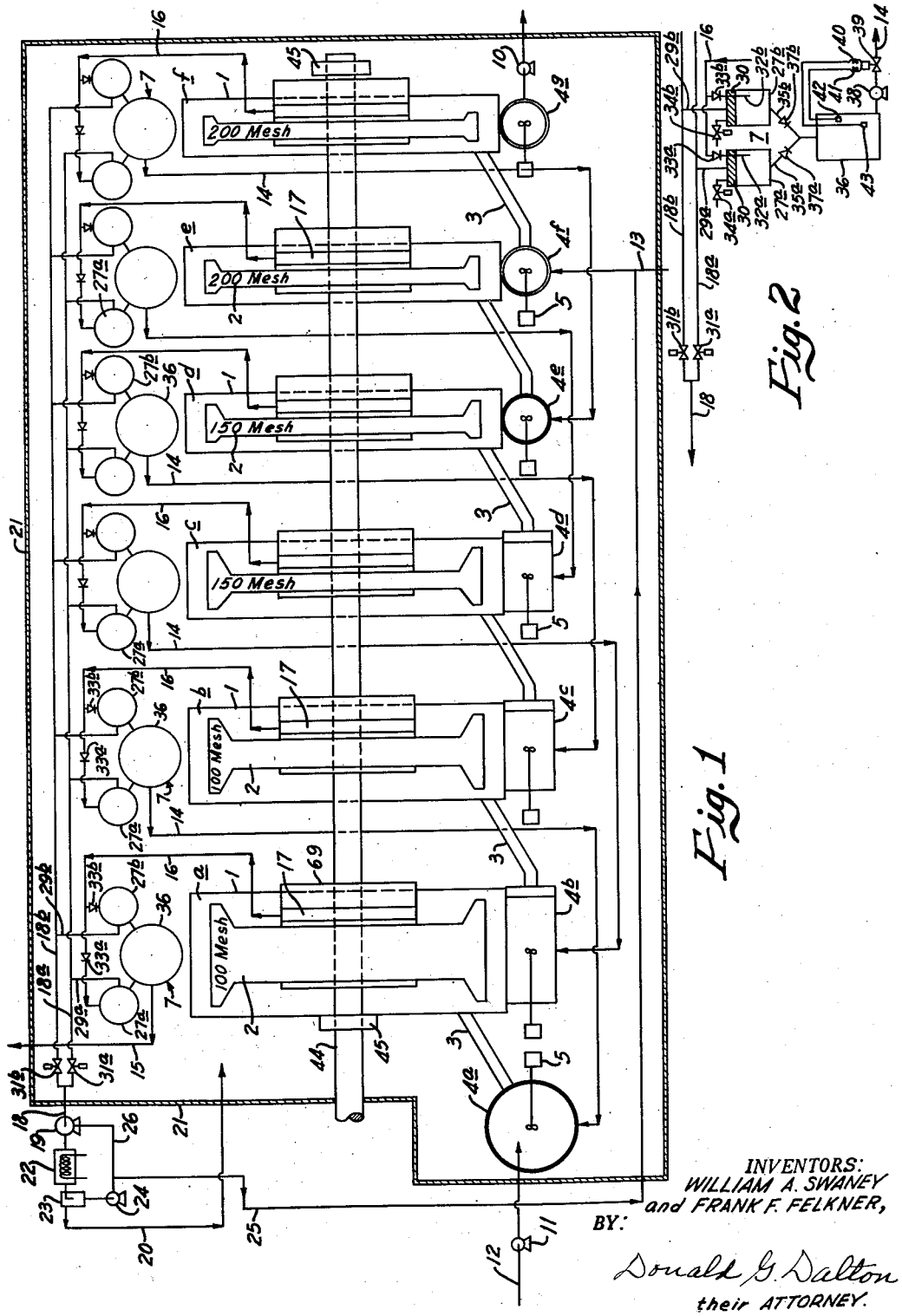

INVENTORS:
WILLIAM A. SWANEY
and FRANK F. FELKNER,
BY: Donald G. Dalton
their ATTORNEY.

March 25, 1958 W. A. SWANEY ET AL 2,828,188
APPARATUS FOR THE RECOVERY OF ANTHRACENE AND THE LIKE
Filed May 19, 1954 3 Sheets-Sheet 3

INVENTORS:
WILLIAM A. SWANEY
and FRANK F. FELKNER,
BY: Donald G. Dalton
their ATTORNEY.

2,828,188
APPARATUS FOR THE RECOVERY OF ANTHRACENE AND THE LIKE

William A. Swaney and Frank F. Felkner, Pittsburgh, Pa., assignors to United States Steel Corporation, a corporation of New Jersey Application May 19, 1954, Serial No. 430,846

4 Claims. (Cl. 23—270)

This invention relates to an apparatus for recovering a relatively insoluble material, for example, an organic composition of crystalline structure, from a mixture therewith of other substances, and, more specifically, for recovering anthracene from a cake or slurry of aromatic hydrocarbon crystals and creosote oil.

More particularly, the apparatus of this invention is comprised of a plurality of consecutively arranged stages into which the mixture containing the material to be recovered is introduced at the initial stage and from which the recovered material is discharged at the final stage, the recovered material being progressively concentrated as it moves through consecutive stages. In a manner to be described, the apparatus utilizes a solvent in which the substances to be removed are soluble and in which the material to be recovered has at best only limited solubility. The solvent is introduced into the apparatus at the final filtering stage and is transferred through the remaining stages in a reverse direction relative to the movement of the recovered material. At each of the stages, the solvent is intimately mixed with the recovered material moving through the consecutive stages so that a portion of the substances to be removed enters into solution therewith, such solution being then separated from the residue suspended therein containing the material to be recovered. As the solvent moves through the stages in this manner, it carries with it progressively increasing quantities of the substances to be removed and is discharged from the apparatus at the initial or mixture receiving stage.

The apparatus of this invention is particularly adapted to the recovery of anthracene from a creosote cake or slurry derived from the creosote oil run-off produced by the fractional distillation of coke-oven tar. More particularly, the apparatus of this invention is adapted to the recovery of anthracene from a creosote cake or slurry of the character referred to in accordance with the process disclosed in the copending application of William A. Swaney, Serial No. 430,845, filed May 19, 1954, to which reference is made for a detailed description thereof.

In the fractional distillation of coke-oven tar, the creosote oil run-off carries with it the heavier aromatic hydrocarbons anthracene, phenanthrene, carbazole, and other unclassified materials which crystallize when the run-off is cooled to about 75° F. from the run-off temperature of about 220° F. and which are recovered in the form of a cake by a filtering operation. The recovered cake is saturated with heavy creosote oil and is readily converted into a heavy slurry by mechanical agitation. The recovery of anthracene from this cake or slurry of course requires the removal of the creosote oil as well as the other hydrocarbon crystals mixed therewith, and this presents a difficult problem since the materials in the mixture have similar boiling points and densities and these material characteristics render conventional recovery procedures impractical.

For the purpose of recovering anthracene from a creosote cake or the like, a recrystallization procedure involving successive heating and cooling steps has been proposed. To render such recrystallization procedures practical, the hydrocarbon crystal content of the creosote cake must be concentrated as by treatment in a centrifuge to remove as much of the creosote oil as possible. Thereafter a solution of the residue is formed by mixing and heating it with a solvent, the heated solution being then cooled to recrystallize the anthracene which is recovered by filtering, and these steps must be repeated at least once in order to obtain a product containing anthracene in the nature of 90–95% purity. Since the heating and cooling steps of this recovery procedure must be carefully controlled, the apparatus required is so expensive as to be not practical and only limited production is obtained. In addition, excessive quantities of solvent are required by this recovery procedure.

One of the principal objects of this invention is to provide an apparatus for the recovery of anthracene from a creosote oil-laden cake or slurry which is relatively less expensive, is capable of much greater production and requires considerably less solvent as compared to the proposed procedure referred to above. In a manner to be described, anthracene is recovered by the apparatus of this invention without the expensive preliminary concentration and subsequent recrystallizing steps required in the said proposed procedure. As indicated, the anthracene is recovered by the apparatus of this invention in accordance with the process disclosed in the above-mentioned copending application of Wiliam A. Swaney. In accordance with this process, a solvent selected from the group consisting of pyridine, alpha picoline, beta gamma picoline, and methyl-ethyl ketone, and preferably pyridine is utilized as the solvent which is introduced into the final stage for effecting a separation of the materials to be removed from the anthracene containing creosote cake or slurry which is the mixture continuously fed to the initial stage of the apparatus as described generally above.

While this invention is particularly adapted to the recovery of anthracene from a creosote cake or slurry, it will be understood that it is capable of general application and has as one of its principal objects the provision of an apparatus for the recovery of relatively insoluble compositions from a mixture therewith of soluble materials.

A more specific object of the invention is to provide an apparatus comprised of a plurality of successively arranged stages at each of which a mixture of a relatively insoluble material to be recovered and soluble materials is intimately mixed with a solvent to form a solution of the soluble materials which is separated from a residue of the insoluble material to be recovered to thereby concentrate the insoluble material to a greater degree.

Another object of the invention is to provide a multiple stage apparatus of the character just referred to through which the solvent and insoluble material move in opposite directions with the solvent containing progressively increasing amounts of soluble matter in solution therewith at each stage and the recovered material being refined at each stage to a condition in which it contains correspondingly decreased amounts of soluble matter.

Still another object of the invention is to provide, in a multiple stage apparatus of the character referred to, filtering elements of foraminous construction at each of the stages, selected ones of successive filtering elements at successive stages having foramina and effective filtering areas which are progressively decreased in accordance with the quantity of recovered material in the cake residue separated from the solution formed at each of the stages.

A further object of the invention is to provide a novel system of transferring the solvent and material to be recovered respectively in a continuous manner and in opposite directions through the different stages of a multistage filtering apparatus.

Other objects and advantages of the invention will be apparent from the following description.

In the drawings there is shown a preferred embodiment of the invention. In this showing:

Figure 1 is a diagrammatic illustration of an apparatus constructed in accordance with the principles of this invention which shows the flow of materials therethrough;

Figure 2 is a diagrammatic illustration of an apparatus used at each of the filtering stages in Figure 1 for collecting the solution formed at such stages;

Figure 3:
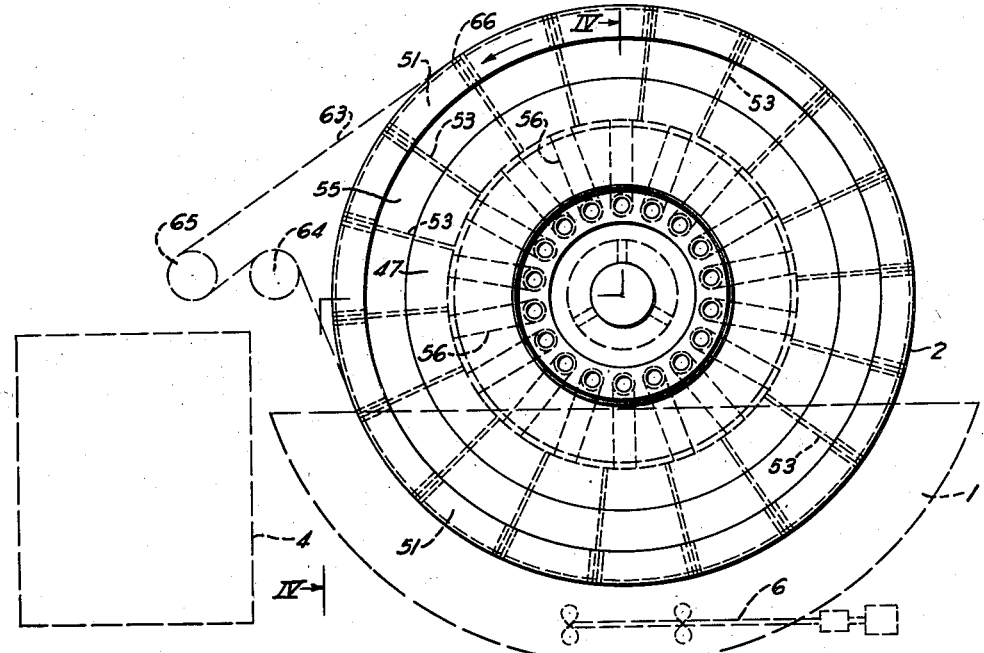
Figure 3 is an end view of one of the rotary filtering units used in the apparatus of Figure 1.

Figure 1 of the drawings shows the apparatus as being comprised of six filtering stages respectively designated by the letters $a$ through $f$ inclusive. Each of the filtering stages has a rotating filter which is constructed in a manner to be described and which is effective to separate a cake of recovered material from a mixture therewith of a solution of soluble substances. At each of the stages, a portion of the soluble substances is removed from the material to be recovered so that the percentage of recovered material in the cake or residue produced at each stage is progressively increased as the material moves through the successive stages from left to right as viewed in Figure 1. While the apparatus is shown as being comprised of six stages, it will be understood that a greater or lesser number of stages may be employed. Generally stated, increasing the number of filtering stages will result in a final product of higher purity while decreasing the number of stages will result in a final product of lesser purity.

At each of the stages, there is provided an upwardly opening slurry pan 1 through which a filter unit 2 is rotated. A slurry is fed to each of the pans 1 through overflow pipes 3 from mixing tanks 4 in which a cake containing the material to be recovered and the soluble substances to be removed is intimately mixed with a solvent in a manner to be described. Each of the mixing tanks 4 has a mixing unit 5 for agitating the cake and solvent supplied thereto to insure intimate mixture of the solvent with the soluble substances in the cake. The slurry pans 1 are provided with agitators 6 (see Figure 3) for agitating the slurry therein to continue the mixing of the solvent with the soluble substances.

Each filter unit 2 is provided with an evacuating unit 7 for withdrawing a solution of soluble substances from the slurry in the pan 1 through which it rotates in such manner that a cake of recovered material is collected on its external surface. The cake of recovered material collected at each stage is removed and fed to the mixing tank for a subsequent stage in a manner to be described. The cake delivered to the tank 4g by the final stage $f$ contains the recovered material in purified form and is not mixed with a solvent but is removed from the apparatus by a positive displacement pump 10 or other suitable discharge mechanism. The mixing tanks 4 for each of the stages following the initial stage $a$ receive the cake collected by the filtering unit 2 at the preceding stage, and the mixing tank 4a for the initial stage $a$ has a crude cake or slurry containing both the soluble substances and material to be recovered delivered thereto by a supply pump 11 connected in a supply conduit 12.

The solvent for the soluble substances is delivered to the mixing tank 4f for the final stage by a supply conduit 13 through which it is fed at a uniform and controlled rate. The solution withdrawn by the evacuating unit 7 from the final stage $f$, is delivered through discharge conduit 14 to the mixing tank 4e for the preceding stage $e$. In like manner, the solution withdrawn by the evacuating unit 7 at each of the remaining stages, excepting the initial stage $a$, is delivered to the mixing tank for a preceding stage and constitutes the solvent for the cake or slurry fed to such stage. The solution withdrawn by the evacuating unit 7 at the initial stage $a$ contains all of the soluble substances removed in the stages $a$ through $f$ and is discharged from the apparatus through a discharge conduit 15. In this manner, the solvent delivered through the supply line 13 is moved successively through the various stages of the apparatus from right to left as viewed in Figure 1 and carries with it progressively increasing amounts of soluble substances.

From the foregoing, it will be apparent that the solvent for the soluble substances and the material to be recovered or refined respectively move through the apparatus in opposite directions, and that the solution formed at each of the stages subsequent to the initial stage $a$ is used as a solvent in the intimately mixed material delivered to the preceding stage. In this manner, a portion of the soluble substances originally mixed with the material to be recovered enters into solution with the solvent at each of the stages for subsequent movement with the solvent to the discharge conduit 15, and the material to be recovered is increasingly concentrated or refined as it moves through the successive stages $a$ through $f$ where it is finally removed by the discharge pump 10.

Each of the evacuating units 7 is connected with a filtering unit 2 through a conduit 16 and a valve ring 17, the solution collected in each filtering unit 2 being withdrawn through a valve ring 17 and conduit 16 in a manner to be described. The various evacuating units 7 are respectively connected through a conduit 18 to the inlet or low pressure side of a vacuum pump 19 which has its outlet or high pressure side connected to a conduit system 20 which has a return connection to the interior of an enclosure 21. The enclosure 21 is an hermetic housing for the apparatus through which an atmosphere is continuously recirculated by the pump 19. A condenser 22 and trap 23 are mounted in the conduit system 20 for condensing and removing solvent from the atmosphere being circulated by the pump 19. A pump 24 withdraws the condensed solvent from the trap 23 and returns it through a conduit 25 to the solvent supply conduit 13. A branch conduit 26 is connected with the outlet of the pump 24 for supplying condensed solvent to a vacuum seal (not shown) on the pump 19. The atmosphere circulated through the return system 20 and the hermetic enclosure 21 may be air or a gas which is particularly adapted for use with the solvent supplied through the conduit 13. The return conduit system 20 is of course connected with the conduit 16 through the interior of the enclosure 21 by the filtering units 2 so that the same atmosphere is continuously recirculated and contamination of the surrounding air is effectively prevented.

The atmosphere and solution withdrawn through the conduits 16 must be separated for delivery of the atmosphere to the conduit 18 and for delivery of the solution to the conduits 14, and, for this purpose, the units 7 are constructed as shown in Figure 2. The units 7 are comprised of elements which are conventional and which have been accordingly illustrated diagrammatically in the showing of Figure 2. Each of the units comprises a pair of collector tanks 27a and 27b which are alternately rendered effective through control valves and conduits to provide evacuating connections between the conduits 16 and conduit 18. For this purpose, the conduit 18 has a pair of vacuum manifolds 18a and 18b respectively having connecting conduits 29a and 29b providing evacuating connections to the interiors of the $a$ and $b$ series of tanks 27 through filters 30 in the tops thereof. The filters 30 are made of any suitable material, such as steel wool, effective to separate liquid from the atmosphere being evacuated from the tanks 27. The manifolds 18a and 18b are provided with solenoid actuated shut-off valves 31a and 31b which are alternately operated so that only one of the a and b series of tanks is evacuated at any given time. The evacuating connections of the conduits 16 are completed from the tanks 27 through conduits 32a and 32b which respectively have their terminal ends opening into the tanks 27 at a level below the filters 30 and are provided with alternately operated solenoid actuated shut-off valves 33a and 33b. The collector tanks are further provided with solenoid actuated air admission valves 34a and 34b which are alternately actuated to admit air to the tanks to effect a discharge of the solution collected therein through conduits 35a and 35b to a discharge tank 36, the conduits 35a and 35b respectively having alternately operated shut-off valves 37a and 37b therein.

The solution collected in each tank 36 is discharged by a pump 38 through a discharge conduit 14, or in the case of the unit 7 at the initial stage a through the discharge conduit 15. The rate of discharge by the pump 38 is regulated by a motor operated control valve 39. The valve 39 is a conventional regulating device having coils 40 and 41 for effecting opening or closing movement thereof. Upon energization of one of the coils 40 or 41, the valve 39 will be slowly moved in opening or closing directions. Energization of the coils 40 and 41 is effected by control devices 42 and 43 positioned at different levels in the tank 36 which respectively include a normally open switch (not shown) which closes in response to changing level of the liquid in the tank 36 and energizes one of the coils 40 or 41 to regulate the setting of the control valve 39. When the level of the liquid in the tank 36 rises to the upper control device 42, its switch (not shown) closes and energizes the coil 40 to effect a slow opening movement of the valve 39 and render the pump 38 operative to discharge fluid at a greater rate. Opening movement of the valve 39 continues until the level of fluid in the tank 36 falls below the control device 42 which then operates by a closing of its control switch (not shown) to deenergize the coil 40 and discontinue opening movement of the regulating valve 39. If the solution is being withdrawn too rapidly from the tank 36, its level will fall below the control device 43 and the switch (not shown) therein will close to energize the coil 41 to effect a closing movement of the control valve 39 and reduce the rate of discharge from the tank 43. The control devices 42 and 43 operate to effect slow adjustments of the regulating valve 39 in such manner that the solution is withdrawn from the tank 36 at a rate which maintains the level of fluid therein between the control devices 42 and 43. The vertical spacing of the control devices 42 and 43 is adjusted to the quantity of fluid delivered thereto periodically from the collector tanks 27a and 27b.

A timed actuator (not shown) is provided for alternately operating at timed intervals the a and b series of control valves referred to above in such manner that one of the a or b series of collector tanks 27 is being filled with solution withdrawn from the filtering units while the other is being discharged into the discharge tanks 36. Assuming that the filling period for the a series of collector tanks 27 has ended, the valves 31a and 33a are closed to interrupt the evacuating connections through the tanks 27a, and the valves 34a and 37a are opened to admit air to the interior of the tanks 27a and to open the discharge conduits 35a so that their contents will be discharged into the tanks 36. At the same time, the valves 31b and 33b are opened and the valves 34b and 37b are closed to establish an evacuating connection to the b series of tanks 37 which begin to collect the solution withdrawn from the filtering units. In like manner, and after a subsequent period of time, the control valves are again actuated to empty the b series of collector tanks 27 and to fill the a series thereof. During these periodic operations of the tanks 27a and 27b, the discharge of the collected solution from the tanks 36 into the conduits 14 and 15 under the control of the regulating valves 39 is maintained at a uniform rate.

Referring again to Figure 1, each filtering unit 2 is mounted on a common drive shaft 44 rotatably supported in bearings 45. The shaft 44 is provided with driving mechanism (not shown) for rotating it and the filter units mounted thereon at speeds varying from about ¼ R. P. M. to about 2 R. P. M.

Figure 4:
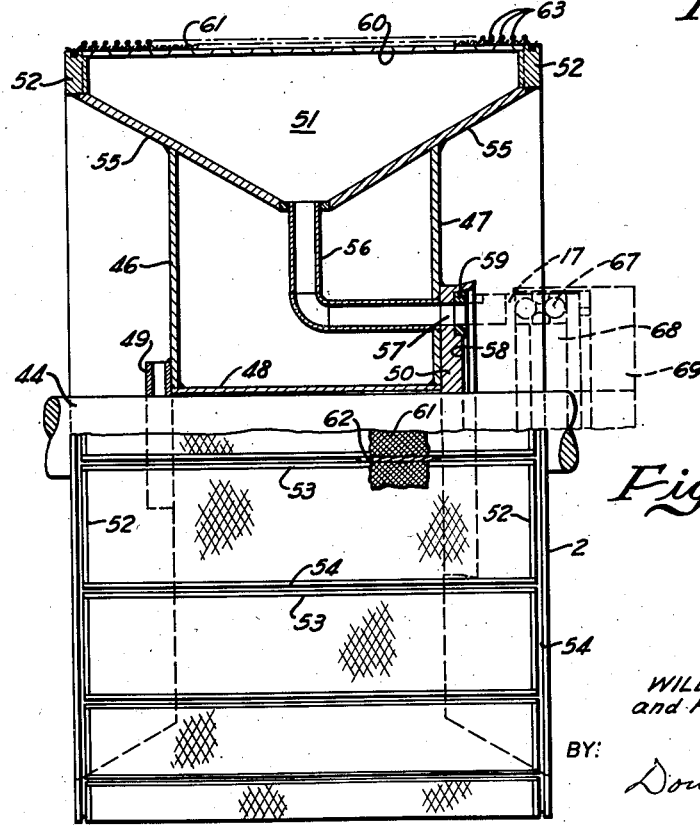
Figure 4 is a side elevation and vertical sectional view taken along the line IV—IV of Figure 3.

Except for the areas of the filtering elements and their respective mesh sizes which are varied at the different stages in a manner and for a purpose to be described, the units 2 are constructed as shown in Figures 2 through 4. Each of the units comprises a pair of annular and axially spaced end plates 46 and 47 which have their inner edges secured to the ends of a cylinder 48. Retaining rings 49 and 50 welded to the outer surfaces of the plates 46 and 47 mount the unit on the drive shaft 44 for rotation therewith. A plurality of circumferentially spaced filtering compartments 51 are arranged about the peripheries of the plates 46 and 47. Each of the compartments is defined by end rings 52 and transversely extending compartment plates 53. The outer edges of the rings 52 and plates 53 have filter cloth mounting grooves 54, and their inner edges are welded to angularly converging plates 55 which in turn are welded to the outer edges of the end plates 46 and 47. At the apex of the converging plates 55, each compartment 51 has a connection with a discharge conduit 56 which is connected with aligned ports 57 in the end plate 47 and mounting ring 50 to provide an exhaust connection through the valve ring 17 in a manner to be described. The valve ring 17 has an annular end face 58 which has sliding engagement with the outer surface of mounting ring 50, a gasket 59 of sealing material being mounted by the ring 50 and having ports therein aligned with the exhaust ports 57 to provide a fluid seal between the mounting ring 50 and valve ring 17.

Each compartment 51 has an outwardly facing opening which is provided with an expanded metal supporting plate 60 having its edges secured to the edges of the compartment plates 53 and the end rings 52 to provide a support for a wire mesh cloth 61 which is wrapped about the exterior surface of each filter unit. As shown fragmentarily in Figure 4, the cloth 61 is secured in position by sections of rope 62 which wedge the cloth in the grooves 54. The openings in the cloth 61 and expanded metal supports 60 provide for the flow of fluid into the compartments 51 while excluding the recovered material which is collected on the external surface of the cloth 61. This cake of recovered material is removed from the cloth 61 by a string discharge mechanism of conventional construction which, as shown in Figures 3 and 4, is comprised of axially spaced strings 63 which are wrapped about the external surface of the wire cloth 61 and reeled over pulleys 64 and 65. As the filter rotates in the direction indicated by the arrow in Figure 3, the recovered cake is stripped from the cloth 61 at the point 66 and carried to the pulley 65 where it is delivered to the mixing tank 4 positioned under the pulley 65.

Figure 6:
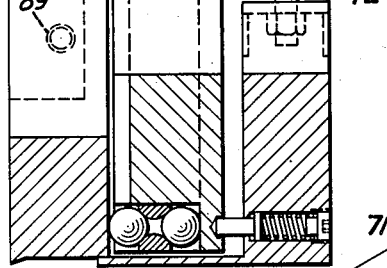
Figure 6 is a sectional view showing an assembly of the valve ring and mounting rings therefor.
Figure 7:
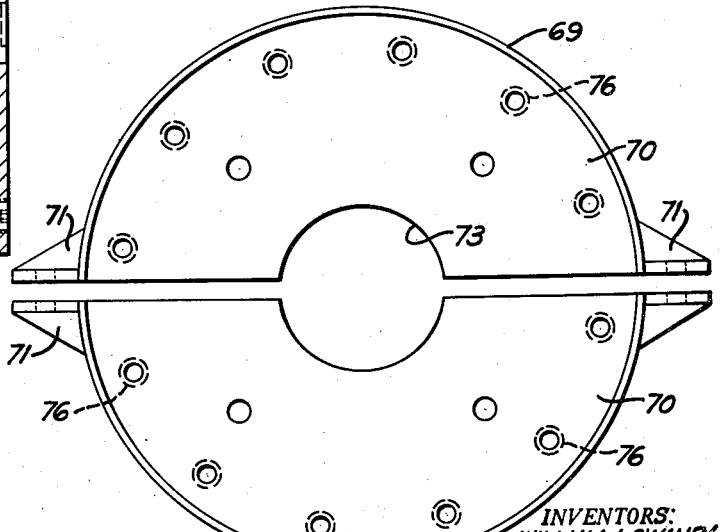
Figure 7 is an end elevational view of a mounting collar used in the assembly of Figure 6.

The valve ring 17 which is fixed against rotation in a manner to be described is forced axially to a position with its face engaged with port ring 50 by thrust bearings 67 mounted in a mounting ring 68 which has its movement resiliently biased in an axial direction to the left as viewed in Figure 4 with respect to a set collar 69. As best shown in Figures 6 and 7, the set collar 69 is formed of two parts 70 of semi-circular shape respectively having clamping flanges 71 which are provided with openings for reception of the bolts 72 to clamp the collar on the shaft 44 for rotation therewith, each of the parts 70 having a recess 73 of semi-circular shape in which the shaft 44 is received. The outer periphery of each part 70 has an axially extending flange 74 which forms a cover for the mounting ring 68 which is mounted concentrically therewith. The ring 68 is mounted loosely on the shaft 44 and has its movement biased in an axial direction to the left as viewed in Figure 6 by plungers 75 slidably mounted in openings 76 in the set collar 69, biasing springs 77 being provided in the openings 76 for moving the plungers 75 outwardly with respect thereto. The outer ends of the plungers 75 are received in openings 78 in the mounting ring 68 and provide driving connections for rotating the mounting ring 68 with the set collar 69 in addition to biasing the mounting ring 68 and the valve ring 17 in a direction toward the port ring 50. The thrust bearings 67 are received in an annular space 79 about the periphery of the mounting ring 68 and are effective to transmit the thrust of the plungers 75 to the valve ring 17.

Figure 5:
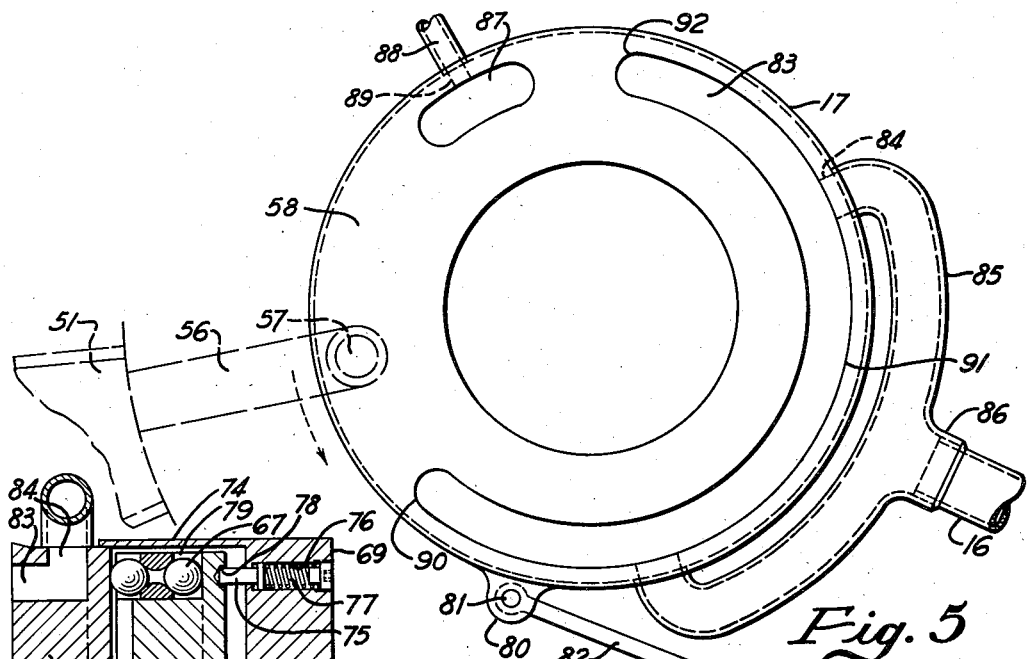
Figure 5 is an end elevational view of a valve ring used in each of the filtering stages.

As indicated above, the valve rings 17 are held against rotation with respect to the drive shaft 44. For this purpose, and as shown in Figure 5, each valve ring is provided with an anchoring lug 80 having a pivot pin 81 secured to the end of an anchoring rod 82. The other end of the anchoring rod 82 has an adjustable connection (not shown) to a stationary support (not shown) for holding the valve ring 17 against rotational movement and for adjusting its angular position on the drive shaft 44. As shown in Figures 5 and 6, each valve ring 17 has a circumferentially and axially extending port 83 which opens into the annular end face 58 thereof which has sliding engagement with the outer face of the retaining or port ring 50. Radially extending ports 84 connect the port 83 with a manifold 85 which has a connection at 86 with one of the evacuating conduits 16. Intermediate the ends of the elongated port 84, the ring is provided with a shorter circumferentially and axially extending port 87 which communicates with a conduit 88 through a radially extending port 89. The conduit 88 is connected with a source (not shown) of compressed air for a purpose to be described.

The manner in which the ports 83 are effective to evacuate the compartments 51 and discharge the liquid solution collected therein will be best understood by considering the action which takes place as the compartment 51 shown in dotted lines in Figure 5 rotates in the direction indicated by the arrow. When the aligned ports 57 at the inner end of the conduit 56 move to a position communicating with the end 90 of the port 83, evacuation of the interior of the compartment 51 is started. At this position, the portion of the filter screen 61 covering the outer end of the compartment 51 will move into the slurry in the slurry pan 1 through which the filter is rotating, and evacuation will be completed when the screen is completely submerged. Due to the pressure difference of the pressure acting against the surface of the liquid in the pan 1 and the pressure within the compartment 51, the solution in the slurry is forced through the filtering screen 61 into the compartment 51 leaving a residue containing the insoluble material to be recovered on the outer surface of the screen 61. Flow of solution through the screen 61 will continue at least until the evacuating ports 57 move to the point 91 at which point the compartment 51 moves out of the slurry. As the evacuating ports 57 move beyond the point 91, the solution in the compartment 51 will flow downwardly over the plates 55. As the solution flows downwardly over the plates 55, it moves into the conduit 56 at the inner end of the compartment 51 and is evacuated through the ports 57. Evacuation of the solution from the compartment 51 will have been completed when its evacuating ports 57 move out of the engagement with the port 83 at the point 92. Venting the compartment 51 begins at the point 92 and is completed when the ports 57 connect with the air supply port 87. Admission of compressed air through the port 87 pressurizes the interior of the compartment 51 and loosens the material collected on the screen 61 to facilitate its removal by the discharge strings 63. Admission of air through the port 87 is additionally effective for cleaning the filter openings in the screen 61. Since the same operating cycle is continuously repeated by all of the compartments 51, it will be apparent that each rotating filter unit 2 is effective to continuously separate and withdraw a liquid solution from the slurry pan 1 through which it rotates and to collect and deliver a cake of recovered material to the mixing tank 4 for a subsequent stage.

It will be recalled that the filter units are identical in construction except for the mesh sizes and effective filter areas of the screens 61. The sizes of the foramina in the filter screens 61 and their effective filter areas are made smaller at successive stages in accordance with the quantity and size of the particles in the material to be recovered. If the same size of foramina were used in each of the filtering screens 61, particles collected on the screen at the initial stage $a$ might pass through the filtering screens at subsequent stages by the action of the solvent in removing soluble substances adhering thereto and in reducing the effective particle size. Moreover, the bulk of recovered cake is reduced at each stage by the dissolving action of the solvent, and would be insufficient to provide an effective covering layer of cake on the surface of the filter screens 61 at later stages if all of the filter elements were of the same size and had the same effective filtering area. To prevent loss of the material to be recovered by movement through the filtering screens at successive stages, at least selected ones of successive filtering screens 61 have a mesh or foramina size which is made progressively smaller. In order to assure the formation of an adequate covering of the character or residue on the external surfaces of the filtering elements 61 at successive stages and thereby proper operation of the filtering units, at least selected ones of successive filtering stages have progressively decreasing filtering areas.

Referring to Figure 1, attention is directed to the fact that the successive filtering units 2 at the stages $a$ through $f$ have an axial length which is progressively decreased. Decreasing the axial length of the filtering units 2 in this manner results in a progressive reduction of the effective filtering area at each of the stages. This reduction in effective filtering area at successive stages compensates for the removal of the soluble substances at preceding stages and insures proper filter action by obtaining an adequate covering of cake on the exterior surface of the filtering screens 61 at successive stages. In Figure 1, the mesh size of the filtering elements at the stages $a$ and $b$ is indicated as 100 mesh, 150 mesh at the stages $c$ and $d$, and 200 mesh at the stages $e$ and $f$, this variation in the mesh size of the filtering elements having been found adequate for the recovery of anthracene from a creosote oil cake or slurry using pyridine as a solvent. It will of course be understood that the axial depth and thereby the effective filtering areas at successive units 2 as well as the size of the filter foramina will vary with the particle size in the material to be recovered.

In the operation of the apparatus for the recovery of anthracene, the crude cake or slurry recovered from a creosote oil fraction as described above and containing the anthracene to be recovered is continuously fed to the initial mixing tank $4a$ at one end of the apparatus and solvent is continuously fed to the final mixing tank $4f$ at the other end of the apparatus. The materials are fed and all of the operations at the different stages are conducted at room temperature. As the solvent moves through each filter stage to the discharge conduit 15, a portion of the soluble substances originally in the crude slurry introduced at $4a$ enters into solution with the solvent for movement with the solvent to the discharge conduit 15, and the quantity of anthracene in the recovered cake is progressively increased as it moves through successive stages to the final collecting tank $4g$. As explained in the above-mentioned copending application, the preferred solvent for the recovery of anthracene is selected from the group consisting of pyridine, its homologues alpha picoline and beta gamma picoline, and methyl-ethyl ketone since these solvents give a recovery of anthracene of 90% to about 94% purity at the collecting tank 4g. When one of the preferred solvents is used, the solvent is saturated with anthracene in the final stages e and f with some removal of soluble substances being effected at both stages and being more pronounced in the stage e. The heavier aromatic hydrocarbons such as the carbazole, napthalene, phenanthrene, and other unclassified high boiling point hydrocarbons are removed from the cake primarily in the stages c and d. Since the anthracene delivered to the final stage f is highly concentrated and has limited solubility in one of the preferred solvents, the solvent is substantially saturated with anthracene in the final stage and is thus not noticeably effective to remove further amounts of anthracene as it moves through the preceding stages. When the solvent containing the higher boiling point hydrocarbons in solution therewith moves through the initial stages a and b it removes the lighter and other lower boiling point hydrocarbons.

Although one of the preferred solvents is desirable in the use of the apparatus for recovering anthracene, it will be understood that the apparatus of this invention is not limited to any particular solvent. For example, any organic solvent such as the higher alcohols or the hexane family of solvents may be used. However, the latter solvents will not remove heavier hydrocarbons such as the carbazoles, napthalene, and phenanthrene while they will remove the lower boiling hydrocarbons, and the residue recovered will contain about 50% to 60% anthracene compared to a recover of 90% to 94% anthracene when using one of the preferred solvents. While the apparatus of this invention is particularly adapted to the recovery of anthracene from a creosote cake or slurry in which it is contained, it will be further understood that it is not limited to the recovery of any particular material but may be used for the recovery of other solid materials which are capable of being filtered out of a solution in which it is intermingled. In the use of the apparatus for the recovery of other materials, attention is particularly directed to the fact that the material is washed and cleaned with a solvent at each of the successive stages and that the solvent used at the successive stages is progressively cleaner, the solvent being introduced in substantially pure condition at the final stage and becoming progressively more loaded with dissolved substances as it moves through preceding stages in counterflow relation to the movement of the recovered material through successive stages.

While one embodiment of our invention has been shown and described it will be apparent that other adaptations and modifications may be made without departing from the scope of the following claims.

We claim:

1. In a continuous filtering apparatus including a plurality of successively arranged filtering stages through which a material to be recovered and a solvent for soluble matter mixed therewith have a counter-current movement, each of said stages including a receptacle for receiving a slurry of said solvent and material and a vacuum filter mounted for rotation therein, the combination therewith of a closed system for circulating an evacuating atmosphere through said filters comprising an hermetic enclosure in which said filters and receptacles are mounted, separate evacuating conduits connected with said filters, a common evacuating manifold means, a separate means for connecting each of said evacuating conduits with said manifold means including means for separating the filtrate removed at each of said filters from the evacuating atmosphere, each of said separating means having a transfer conduit into which the filtrate separated thereby is delivered, a single vacuum pump for evacuating said manifold means and for returning the atmosphere evacuated thereby to the interior of said enclosure, slurry mixing tanks for supplying said receptacles respectively with the slurry to be filtered, the said fluid transfer conduits at the stages subsequent to the initial stage being connected for discharge into the said slurry mixing tanks for the preceding stages, and a discharge conduit connected with the fluid transfer conduit at the initial stage for removal of said solvent and soluble material from the apparatus.

2. A filtering apparatus as defined in claim 1 characterized by the provision of condenser means for removing vaporized solvent from the atmosphere being returned to said enclosure.

3. A filtering apparatus as defined in claim 1 characterized by each of said fluid separating means including a pair of collector tanks, and said manifold means comprising a pair of branch manifolds, and selectively operable valve means for alternately effecting through said manifold means an evacuating connection for one collector tank in each of said pairs through one of said branch manifolds and for the other collector tank in each of said pairs through the other of said branch manifolds.

4. In a continuous filtering apparatus including a plurality of successively arranged filtering stages through which a material to be recovered and a solvent for soluble matter mixed therewith have a counter-current movement, each of said stages including a receptacle for receiving a slurry of said solvent and material and a vacuum filter mounted for rotation therein, the combination therewith of a closed system for evacuating said filters comprising an hermetic enclosure in which said filters and receptacles are mounted, separate evacuating conduits connected with said filters, means for separating the filtrate removed by said conduits at each of said filters from the evacuating atmosphere comprising a pair of filtrate collector tanks for each of said evacuating conduits and valve means for effecting their alternate connection therewith, filtrate discharge tanks for alternate connection with the collector tanks in each of said pairs to receive the filtrate collected thereby and valve means for effecting such alternate connections, an evacuating manifold means comprising a pair of branch manifold conduits, means including selectively operable valve means for alternately effecting through said manifold means an evacuating connection for one collector tank in each of said pairs through one of said branch manifold conduits and for the other collector tank in each of said pairs through the other of said branch manifold conduits, a single vacuum pump for evacuating the atmosphere from said manifold means and for returning it to the interior of said enclosure, separate mixing tanks for supplying said receptacles with the slurry to be filtered, a conduit connected with the discharge tank at each stage subsequent to the initial stage for delivering the filtrate received from said collector tanks to the receptacle supply mixing tank for a preceding stage, and a discharge conduit connected with the discharge tank at said initial stage for removing the filtrate delivered thereto to thereby discharge said solvent and said soluble matter from the apparatus.

References Cited in the file of this patent

UNITED STATES PATENTS

| | | |
|---|---|---|
| 1,199,861 | Barstow et al. | Oct. 3, 1916 |
| 1,922,730 | Gore et al. | Aug. 15, 1933 |
| 2,585,491 | Olsen | Feb. 12, 1952 |

OTHER REFERENCES

Reigel Chemical Machinery, pages 283–285, Reinhold Publishing co., New York, New York.